United States Patent [19]
Rembold

[11] Patent Number: 5,044,903
[45] Date of Patent: Sep. 3, 1991

[54] FUEL INJECTION PUMP FOR INTERNAL COMBUSTION ENGINES

[75] Inventor: Helmut Rembold, Stuttgart, Fed. Rep. of Germany

[73] Assignee: Robert Bosch GmbH, Stuttgart, Fed. Rep. of Germany

[21] Appl. No.: 424,642

[22] Filed: Oct. 20, 1989

[30] Foreign Application Priority Data

Dec. 30, 1988 [DE] Fed. Rep. of Germany ....... 3844367

[51] Int. Cl.$^5$ .............................................. E04B 7/06
[52] U.S. Cl. .................... 417/500; 123/300; 123/449
[58] Field of Search ............... 123/299, 300, 449; 417/494, 499, 500

[56] References Cited

U.S. PATENT DOCUMENTS

| | | | |
|---|---|---|---|
| 4,693,227 | 9/1987 | Satou | 123/300 |
| 4,709,673 | 12/1987 | Babitzka | 123/299 |
| 4,795,898 | 5/1988 | Egler et al. | 123/300 |
| 4,831,986 | 5/1989 | Linder et al. | 123/300 |
| 4,834,055 | 5/1989 | Steiger | 123/300 |

FOREIGN PATENT DOCUMENTS 0206664 11/1984 Japan ................................... 123/300

*Primary Examiner*—Leonard E. Smith
*Assistant Examiner*—John A. Savio, III
*Attorney, Agent, or Firm*—Edwin E. Greigg; Ronald E. Greigg

[57] ABSTRACT

A fuel injection pump for internal combustion engines, having a piston driven for simultaneous reciprocation and rotation and embodied both as a pump piston periodically pumping fuel and as a distributor piston rotatable in the guide bore. The piston includes distributor openings that discharge at its jacket face and communicate with various injection nozzles as a function of the rotational position of the distributor piston. During the supply stroke of the pump piston, a branch line is connected to the work chamber of the pump piston, which branch line is connectable, via separate distributor openings of the distributor piston with at least one injection nozzle different from the injection nozzle connected directly, via a different distributor opening to the work chamber (5).

23 Claims, 3 Drawing Sheets

FUEL INJECTION PUMP FOR INTERNAL COMBUSTION ENGINES

BACKGROUND OF THE INVENTION

The invention relates to a fuel injection pump for internal combustion engines, having a piston driven for simultaneous reciprocation and rotation and embodied both as a pump piston periodically pumping fuel and as a distributor piston rotatable in the guide bore; the piston has distributor openings discharging at its jacket face and communicating with various injection nozzles as a function of the rotational position of the distributor piston during the supply stroke of the pump piston.

German Patent 1 190 731 has disclosed a fuel injection pump operating on the distributor principle, which among other purposes can be used for direct injection of fuel into externally ignited internal combustion engines (Otto engines). The fuel furnished at pumping pressure by a work piston is distributed to the various injection valves by a distributor shaft that rotates at halt the rpm of the crankshaft. This known pump is arranged such that virtually simultaneously with the main injection that immediately precedes ignition, a pre-injection is performed into the working cylinder offset by 360° of crankshaft rotation, or crankshaft angle. The amount of the pre-injection is less than that of the main injection.

One disadvantage of the known fuel injection pump is that neither the total amount of fuel injected nor the ratio of the amounts of the pre-injection and the main injection is variable. Nor can the supply onset or the end of supply be varied during operation, in the known apparatus. The known fuel injection pump is particularly unusable as a basis for modern fuel quantity control, because the pre-injection and the main injection have an effect on one another, resulting in insurmountable problems in fuel quantity distribution. Hydraulic pressure waves are a further factor making for imponderable metering.

In German patent application P 37 22 151.5, an object was to be able to perform the pre-injection and the main injection independently of one another, so that their influence on one another would not have to be a factor. To this end, the fuel injection pump was embodied as defined above, and the piston embodied as both a pump piston and a distributor piston acted via two separate work chambers, to enable separate regulation of the pre-injection and the main injection. The separate work chambers were defined by different faces of the piston and by the common guide bore, and the metering variously intended for the pre-injection and the main injection was enabled by separate magnetic valves. In this arrangement, the magnetic valves were switched in such a way that an opening of the valves terminated whichever injection event was taking place, i.e., either the main injection or the pre-injection.

OBJECT AND SUMMARY OF THE INVENTION

An object of the present invention is to reduce the structural expense and to enable independent metering for the pre-injection and the main injection, even if the pump piston has only one work chamber. To attain this object, the embodiment according to the invention essentially comprises a provision that a branch line is connected to the work chamber of the pump piston and is connectable, via separate distributor openings of the distributor piston, with at least one injection nozzle different from the injection nozzle connected directly, via a different distributor opening, to the work chamber. Because a branch line is connected to the work chamber of the pump piston, fuel under pressure can be supplied via this branch line during the pressure buildup in the pump piston, or also during the main injection event, for the metering to be performed either simultaneously or at a different time of a pre-injection quantity for a different injection nozzle; the desired distribution of the quantity of fuel to be pre-injected is made possible by the distributor piston in or on the pump piston. The pressure available upon the compression stroke of the pump piston can be utilized in the most various ways for the separately regulatable pre-injection.

In a particularly simple manner, a partial quantity of the fuel compressed by the pump piston can be utilized for the pre-injection. In this case, the embodiment can simply be such that a throttle is incorporated into the branch line.

Further regulability and greater freedom in terms of the selection of the pre-injection timing is obtained if, as in a preferred embodiment, an intermediate reservoir is incorporated into the branch line. The fuel temporarily stored in such an intermediate reservoir can subsequently be used for the pre-injection at a freely selectable instant, since the intermediate reservoir is capable of maintaining the pressure of the fuel even if the work chamber of the pump piston has already lost pressure, for instance as a result of the shutoff of the main injection. As a rule, where such an intermediate reservoir is used, the design is advantageously such that a check valve closing toward the work chamber of the pump piston is incorporated into the branch line. Alternatively to such a check valve, a magnetic valve may also be incorporated there, and the provision of incorporating a check valve closing toward the work chamber of the pump valve into the branch line may also be of importance for other devices following it, such as servo pistons or metering pistons, as will briefly be explained hereinafter.

Separate regulability of the pre-injection amount is attainable in a simple manner by incorporating at least one magnetic valve into the branch line. Such a magnetic valve can be used in various ways. For example, such a valve may be embodied as a multi-position valve, which either allows or blocks the flow of fuel out of the work chamber of the pump piston via the throttle. In that case, the magnetic valve is incorporated directly into the branch line. However, a magnetic valve can also be mounted on the branch line, in order to fill an intermediate reservoir, or to evacuate the volume collected in an intermediate reservoir again by opening up the chamber effecting the filling and connecting this chamber to a return flow line. In that case, the pre-injection is effected upon the evacuation. Conversely, such a magnetic valve may also be incorporated into the line connecting the reservoir chamber of the pressure reservoir to the distributor openings, in which case the intermediate reservoir cannot be evacuated until the magnetic valve is displaced into a position in which the intermediate reservoir is put into communication with the appropriate distributor openings of the distributor piston.

Instead of the disposition of an intermediate reservoir, the embodiment may advantageously be such that a metering piston displaceable counter to the force of a spring is connected to the branch line, with the work chamber of the metering piston that is located opposite the branch line communicating with the separate distributor openings. Such a metering piston has an essential advantage, above all, that the quantity of fuel intended for the pre-injection, need not be drawn from the pressure line for the main injection. Instead, upon appropriate actuation, the metering piston can on its own aspirate fuel from a tank, and the aspirated quantity can subsequently be released by the action of pressure fluid upon the metering piston.

In a particularly simple manner, if a pressure reservoir or metering piston is used, the embodiment may be such that in one position, the magnetic valve connects the storage chamber of the pressure reservoir or the work chamber of the metering piston to a supply line for fuel, and in a second position disconnects this connection; as a result, a magnetic valve can at the same time act as a check valve. Both the pressure reservoir and the servo or metering piston can be spring-actuated in a simple manner, so that either the working stroke to expel the temporarily stored fluid intended for the pre-injection or the intake stroke can take place under the influence of spring action.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
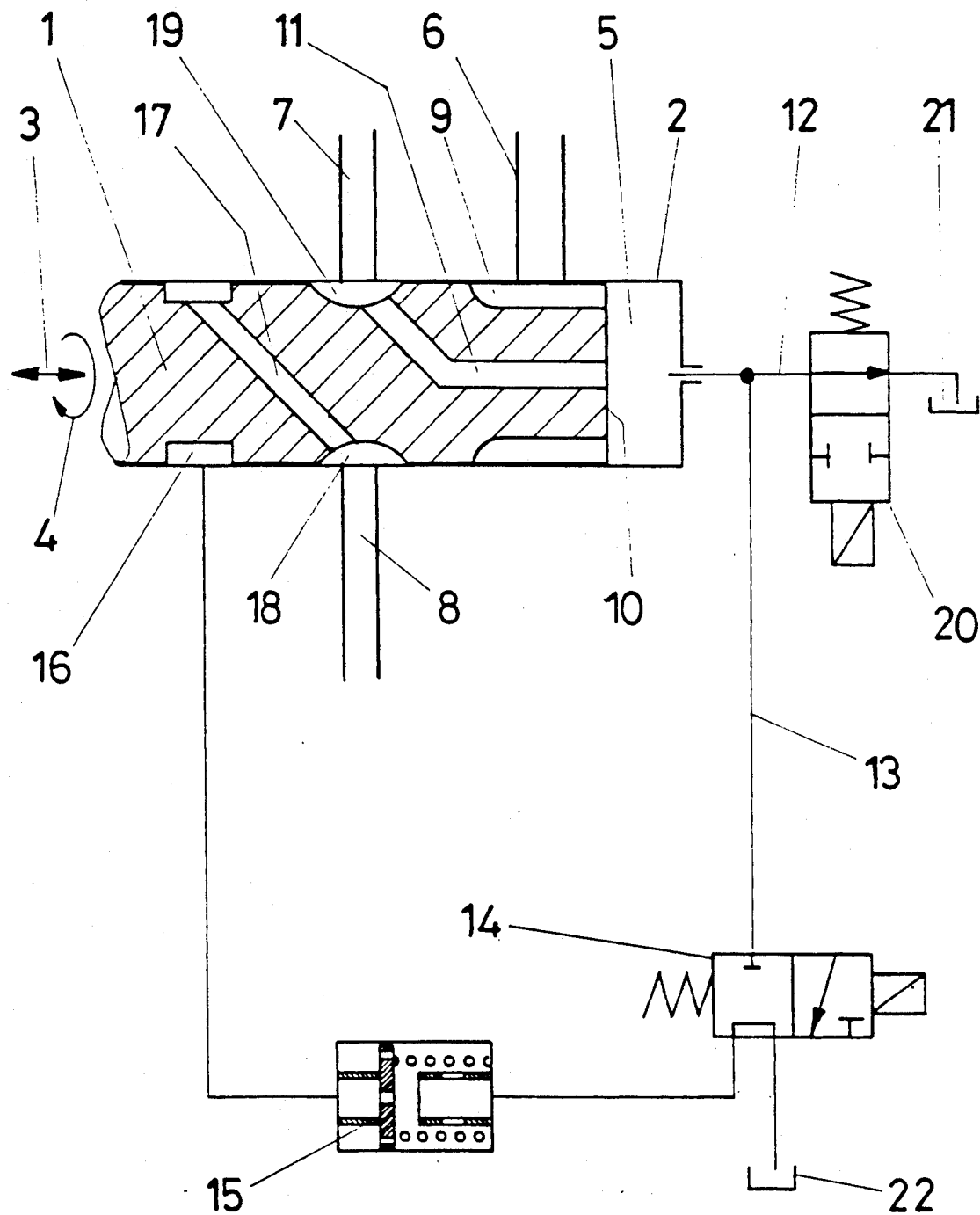
FIG. 1 is a schematic illustration of a first embodiment of a fuel injection pump according to the invention, with both a magnetic valve and a throttle incorporated into the branch line connected to the work chamber of the pump piston.

In FIG. 1, a piston 1 is schematically shown, which is driven to reciprocate and simultaneously rotate, as indicated by arrows 3 and 4, in a cylindrical guide bore 2 provided in a pump housing, not shown in further detail. The piston 1 is driven in a manner known per se by a cam mechanism, not shown in further detail, via a shaft that rotates in synchronism with the rpm of the internal combustion engine to which the injection pump supplies fuel. In the case of supply to a four-cycle engine, the pump piston 1 rotates at half the rpm of the crankshaft. The pump piston 1 defines a work chamber 5, into which fuel is supplied at pre-pump pressure via an inflow line 6. Pressure line connections 7 and 8 leading to injection nozzles or injection valves, not shown, are also provided in the pump housing.

Once fuel has been delivered from a fuel supply source, not shown, via the inflow line 6 and via fill grooves 9 in the vicinity of the end face 10 of the piston, a translational motion subsequent to a shutoff of the inflow line 6 resulting from a rotation of the piston 1 causes a pressure buildup in the work chamber 5, which in a suitable rotational position communicates, via a conduit 11 discharging at the end face 10, with the pressure line connection 7 leading to an injection valve. A branch line 12 is also connected to the work chamber 5; via a magnetic valve 14 provided in a succeeding branch line 13 and via a throttle 15, the branch line 12 communicates with a control groove 16 provided on the circumference of the pump and distributor piston 1. Via an oblique conduit 17 communicating with the control groove, or annular groove 16, the second pressure line connection line 8 shown in FIG. 1 leading to an injection valve can likewise be acted upon with fuel, via the distributor opening 18. Thus it is possible, using only a single work chamber 5 of the pump piston 1, to impose fuel upon separate distributor openings 18 and 19, each of which depending on the rotational position of the distributor piston 1, communicates with pressure line connections 7 and 8 to separate injection valves.

The control of the main injection into the pressure line 7 communicating directly with the work chamber 5 and leading to a first injection valve is effected in a manner known per se via a magnetic valve 20 incorporated into the branch line 12, which in the position shown in FIG. 1 opens a connection of the work chamber 5 to a return line or tank 21, so that a main injection is interrupted. When the magnetic valve 20 is closed, a pre-injection into the separate pressure line connection 8 can be effected via the throttle 15 by switching the magnetic valve 14 provided in the line 13. By the interposition of the throttle 15, the feedback on the main injection taking place at the same time is kept at a low level. A slower buildup of pressure in the line connection used for the pre-injection is readily acceptable, because the associated injection quantity for the pre-injection should amount to only about 10% of the main injection quantity. However, in the embodiment shown in FIG. 1 the pre-injection must have been completed no later than when the main injection takes place; this is achieved in every case by actuating the magnetic valve 20. In that case, the action of the spring-loaded throttle device is rescinded, to attain fast closure of the needle. The reversal of the pressure difference causes the plate 15' provided with the throttle bore in throttle 15 to change its position from contact with the upstream stop to contact with the downstream stop. The fuel can now flow out rapidly, via recesses, not shown, on the plate and stop. In the position of the magnetic valve 14 shown in FIG. 1, which is embodied in a simple manner as a 3/2- way valve, a connection of the line containing the throttle 15 is made to a return line or to a pump suction chamber 22 that is kept at low pressure.

Figure 2:
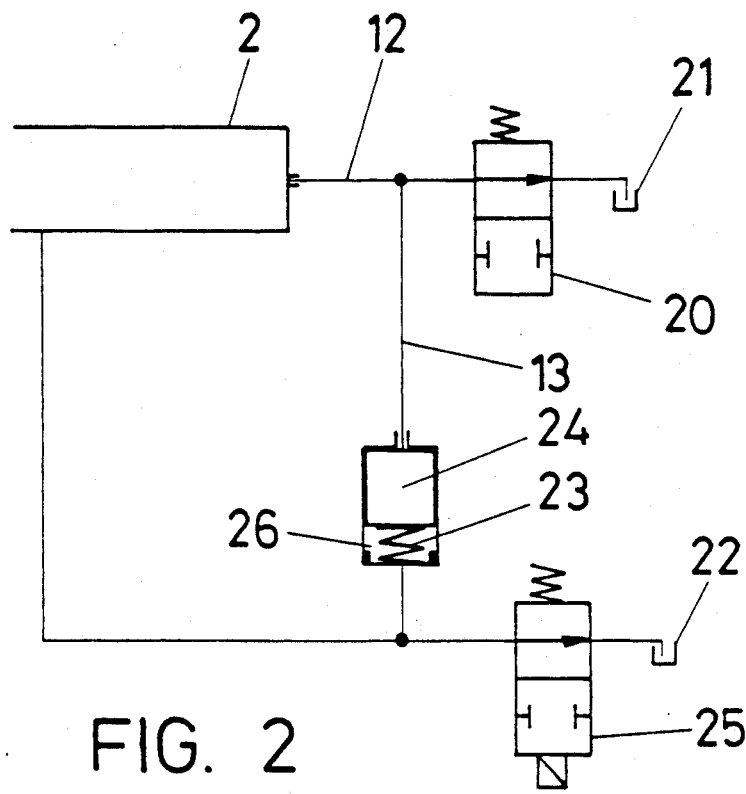
FIG. 2 shows a modification of the embodiment of FIG. 1, with a metering piston incorporated into the branch line.

In the view shown in FIG. 2, for the sake of simplicity only the guide bore 2 of the piston 1 acting as both a pump piston and a distributor piston is shown; this piston is embodied entirely analogously to that shown in FIG. 1. Once again, a branch line 12, in which a magnetic valve 20 is again disposed for controlling the main injection, adjoins the work chamber 5 of the pump piston 1. A metering piston loaded by a spring 23 is incorporated in the branch line 13 that connects to the branch line 12. In the embodiment shown in FIG. 2, a pre-injection is again possible only at an instant of a main injection, if the 2/2-way magnetic valve 25 connected to the line 13 is closed. By the imposition of fuel at high pressure from the work chamber of the pump piston upon the metering piston 24 via the lines 12, 13, a pre-injection of the fuel aspirated in the work chamber 26 of the metering piston 24 from the suction chamber 22 via the magnetic valve 25 is effected via separate distributor openings of the distributor piston as shown in FIG. 1. Once again, the pre-injection can be terminated by suitably switching the magnetic valve 25, and upon termination of the main injection via actuation of the magnetic valve 20 the pre-injection is terminated as well in every case.

Figure 3:
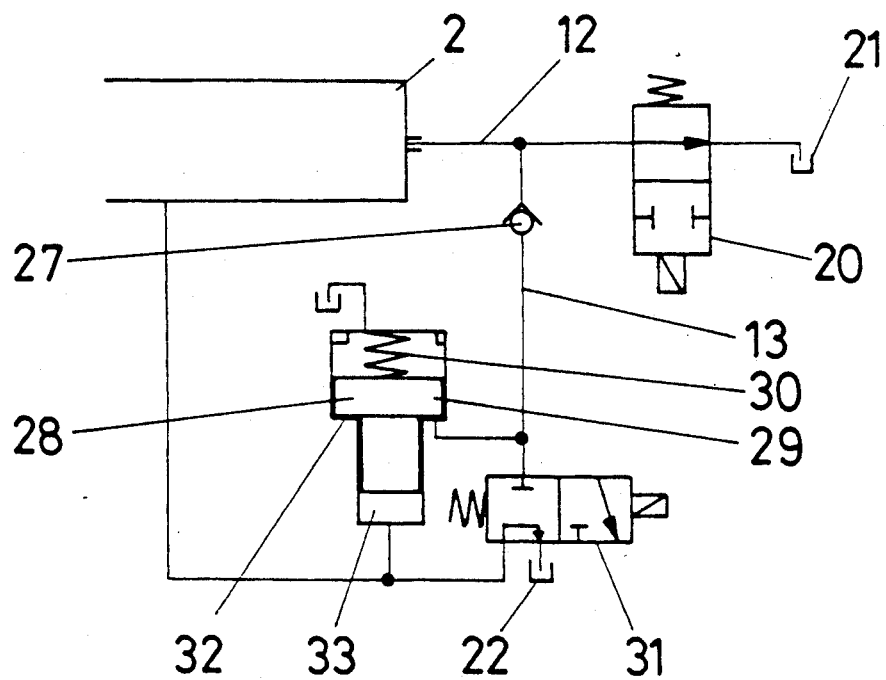
FIG. 3 shows an embodiment of the fuel injection pump according to the invention having an intermediate reservoir in the form of a spring-actuated stepped piston connected to the branch line.

In the embodiment shown in FIG. 3, it is possible to perform a pre-injection even at such times as a main injection into a separate injection valve is not taking place. To this end, a one-way check valve 27 closing toward the work chamber 5 of the pump piston, again not shown in detail here, is incorporated into the branch line 13. Also, incorporated onto the branch line 13 is an intermediate reservoir 29, which is loaded by a spring 30 and is embodied as a stepped piston 28. To control the pre-injection, a magnetic valve 31 is again used. During a main injection, that is, upon a closure of the magnetic valve 20, a work chamber 32 located over the large diameter of the stepped piston 28 can be acted upon via the lines 12, 13, resulting in an aspiration of fuel out of the tank 22 into a separate, further work chamber 33 of the stepped piston 28. Upon an opening of the magnetic valve 20 into the position shown in FIG. 3, the check valve 27 prevents a drop in pressure in the work chamber 32 of the stepped piston, so that after the switchover of the magnetic valve 32 from the position shown in FIG. 3, a pre-injection of the aspirated fuel stored in the work chamber 33 of the stepped piston can take place regardless of the timing of a main injection. Upon a switchover of the magnetic valve 31, a relief of the work chamber 32 into the suction chamber 22 takes place, with a simultaneous spring-effected displacement of the stepped piston 28 and compression of the fuel in the chamber 33 for a pre-injection.

Figure 4:
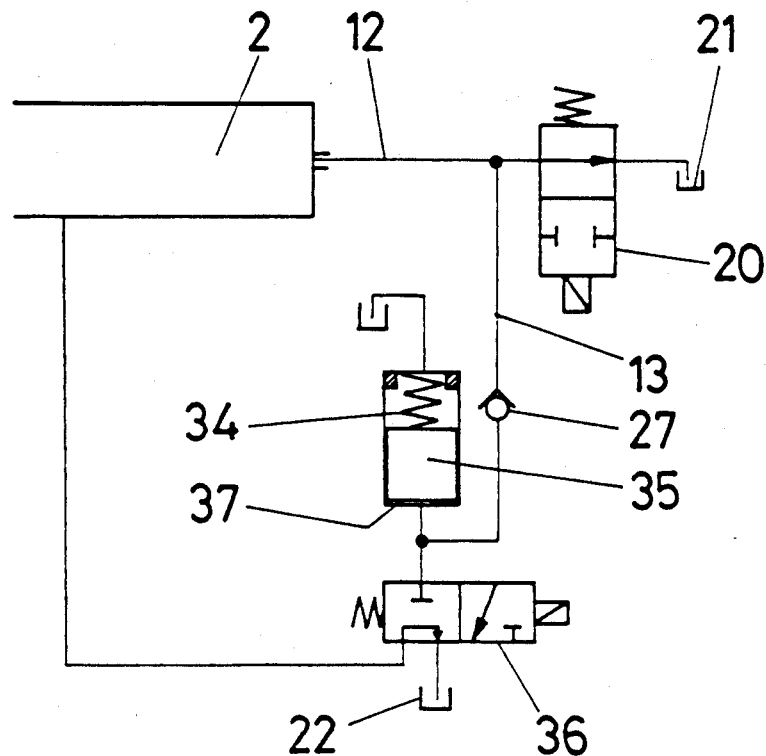
FIG. 4 shows an embodiment having a spring-actuated intermediate reservoir incorporated onto the branch line.

In FIG. 4, a similar embodiment is shown, but instead of the stepped piston 28, an intermediate reservoir 35 loaded by a spring 34 is used. During a main injection, a storage of fuel under pressure from the pump work chamber 5 can again be effected, via a one-way check valve 27. The pre-injection independent of the main injection is again tripped by a magnetic valve 36, which in the embodiment shown in FIG. 4 assures a communication between the work chamber 37 of the spring reservoir 35 with the appropriate distributor opening on the distributor piston for the pre-injection. In order largely to preclude feedback, the reservoir 35 can be filled via a throttle, not shown in detail, in addition to being filled via the check valve 27.

Figure 5:
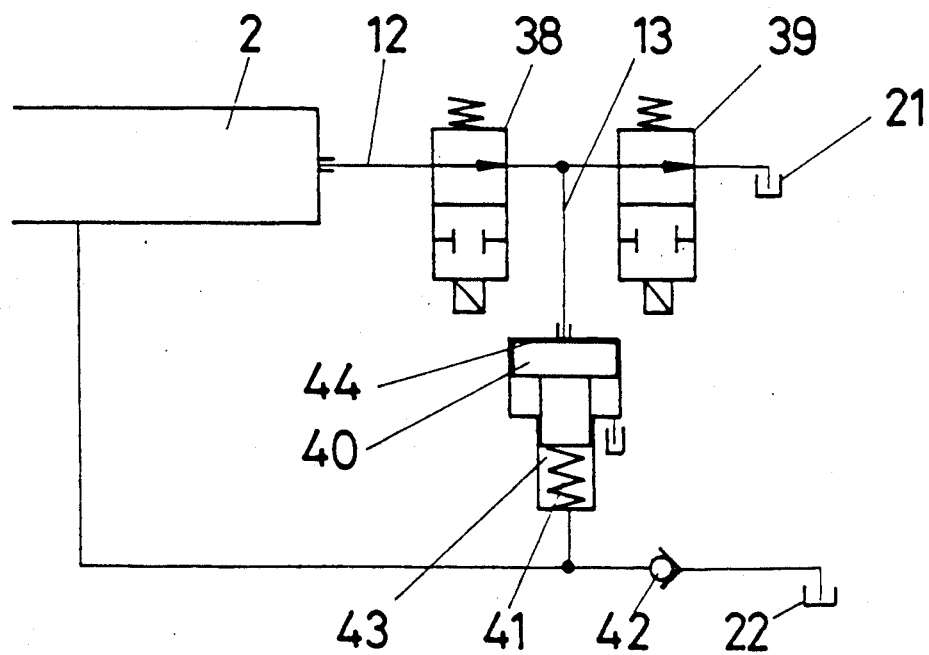
FIG. 5 shows an embodiment having two magnetic valves, connected in series, in the branch line, along with a spring-actuated metering piston.

With the embodiment shown in FIG. 5, the timing of the pre-injection can be varied over an even wider range. Two magnetic valves 38 and 39 are connected in series in the branch line 12 connected to the work chamber of the distributor and pump piston 5, and in the open position of both magnetic valves, communication of the pump work chamber with the tank or return line 21 is again established in order to terminate a main injection and pre-injection. In this embodiment, a metering piston 40 that is loaded via a spring 41 is incorporated into the branch line 13 connected to the branch line 12. In the open position of both magnetic valves as shown in FIG. 5, an aspiration of fuel is effected out of the tank 22 via a one-way check valve 42 into a work chamber 43 of the metering piston 40. For the embodiment shown, many switching options are available. In the event that both valves 38 and 39 are closed, only a main injection takes place, directly from the pump work chamber 5 into a supply line, aligned in accordance with the rotational position of the distributor piston 1, to an injection valve. If the magnetic valve 38 is open and the magnetic valve 39 is simultaneously closed, a main injection and a pre-injection take place simultaneously. For the pre-injection, fuel at high pressure flows via the branch lines 12 and 13 to the stepped piston or metering piston into a work chamber 44, as a result of which the fuel collected in the work chamber 43 is compressed and via the distributor piston is delivered to an injection nozzle for the pre-injection. In the event that both magnetic valves 38 and 39 are initially closed, then with the first magnetic valve 38 closed only a main injection takes place. Once the magnetic valve 38 opens, the diverted compression quantity and the additional pumped quantity is given up by the pump work chamber to the metering piston 40, thereby moving it downward, as explained above, and tripping a pre-injection. The area of the faces of the metering piston both on the side toward the line 13 and on the side toward the work chamber 43 must be dimensioned such that the return flow pressure created after the opening of the magnetic vale 38 is markedly lower than the nozzle closing pressure of whichever injection nozzle a main injection was effected through until the magnetic valve 38 opened. The pre-injection now taking place independently is again terminated by actuation of the magnetic valve 39.

A combination of the series-connected magnetic valves with an embodiment according to FIG. 3, with intermediate storage of the pre-injection quantity, is also possible, and this provides even greater freedom in terms of the selection of the injection events in the main injection and the pre-injection.

With all the embodiments described above, it is possible to inject a pre-injection quantity via an injection nozzle at the time of charge changing at top dead center of the engine, and to inject a main injection quantity via a different injection nozzle at the time of ignition top dead center.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel injection pump for internal combustion engines, comprising a piston having a jacket face and which is driven for simultaneous reciprocation and rotation in a guide bore and there encloses a pump work chamber, said piston being embodied both as a pump piston that periodically pumps fuel, and as a distributor piston rotatable in the guide bore, the piston has a first and a second distributor opening, each of said first and second distributor openings discharge at its jacket face and communicates with various injection nozzles as a function of the rotational position of the distributor piston during a supply stroke of the pump piston, said first distributor opening (19) being permanently connected to said work chamber (5) via a conduit (11) in said distributor piston, further a branch line (13) is connected to the work chamber (5) of the pump piston (1), said branch line is connectable to said second distributor opening (18) of the distributor piston (1) upon rotation of said distributor piston and connectable with at least one injection nozzle different from the injection nozzle connected directly to the work chamber (5) via said first distributor opening (19), said pump work chamber being permanently connected with a relief line (12) which is controlled by a relief valve (20) which upon closure controls an effective stroke of the piston along which fuel under high pressure is delivered to said injection nozzles.

2. A fuel injection nozzle as defined by claim 1, in which a throttle (15) is incorporated into the branch line (13).

3. A fuel injection nozzle as defined by claim 1, in which an intermediate reservoir (29, 35) is incorporated into the branch line (13).

4. A fuel injection pump as defined by claim 1, which includes a check valve (27) incorporated into the branch line (13) that closes toward the work chamber (5) of the pump piston (1).

5. A fuel injection pump as defined by claim 2, which includes a check valve (27) incorporated into the branch line (13) that closes toward the work chamber (5) of the pump piston (1).

6. A fuel injection pump as defined by claim 3, which includes a check valve (27) incorporated into the branch line (13) that closes toward the work chamber (5) of the pump piston (1).

7. A fuel injection pump as defined by claim 1, which includes at least one magnetic valve (14, 20, 25, 31, 36, 38, 39) connected to said branch line.

8. A fuel injection pump as defined by claim 2, which includes at least one magnetic valve (14, 20, 25, 31, 36, 38, 39) connected relative to said branch line.

9. A fuel injection pump as defined by claim 3, which includes at least one magnetic valve (14, 20, 25, 31, 36, 38, 39) connected relative to said branch line.

10. A fuel injection pump as defined by claim 4, which includes at least one magnetic valve (14, 20, 25, 31, 36, 38, 39) connected relative to said branch line.

11. A fuel injection pump as defined by claim 5, which includes at least one magnetic valve (14, 20, 25, 31, 36, 38, 39) connected relative to said branch line.

12. A fuel injection pump as defined by claim 6, which includes at least one magnetic valve (14, 20, 25, 31, 36, 38, 39) connected to said branch line.

13. A fuel injection pump as defined by claim 1, which includes a metering piston (24, 29, 40) connected to the branch line (13), said metering piston displaceable counter to a force of a spring (23, 30, 41) that acts thereon and a second work chamber (23, 32, 44) located opposite the branch line (13) that communicates with said the separate distributor openings (18).

14. A fuel injection pump as defined by claim 2, which includes a metering piston (24, 29, 40) connected to the branch line (13), said metering piston displaceable counter to a force of a spring (23, 30, 41) that acts thereon and a second work chamber (23, 32, 44) located opposite the branch line (13) that communicates with said the separate distributor openings (18).

15. A fuel injection pump as defined by claim 3, which includes a metering piston (24, 29, 40) connected to the branch line (13), said metering piston displaceable counter to a force of a spring (23, 30, 41) that acts thereon and a second work chamber (23, 32, 44) located opposite the branch line (13) that communicates with said the separate distributor openings (18).

16. A fuel injection pump as defined by claim 4, which includes a metering piston (24, 29, 40) connected to the branch line (13), said metering piston displaceable counter to a force of a spring (23, 30, 41) that acts thereon and a second work chamber (23, 32, 44) located opposite the branch line (13) that communicates with said the separate distributor openings (18).

17. A fuel injection pump as defined by claim 7, which includes a metering piston (24, 29, 40) connected to the branch line (13), said metering piston displaceable counter to a force of a spring (23, 30, 41) that acts thereon and a second work chamber (23, 32, 44) located opposite the branch line (13) that communicates with said the separate distributor openings (18).

18. A fuel injection pump as defined by claim 3, in which said magnetic valve (25), in one position connects the work chamber (23) of the metering piston (24) to a supply line for fuel, and in a second position disconnects this connection.

19. A fuel injection pump as defined by claim 7, in which said magnetic valve (25), in one position connects the work chamber (23) of the metering piston (24) to a supply line for fuel, and in a second position disconnects this connection.

20. A fuel injection pump as defined by claim 13, in which said magnetic valve (25), in one position connects the work chamber (23) of the metering piston (24) to a supply line for fuel, and in a second position disconnects this connection.

21. A fuel injection pump as defined by claim 3, in which said magnetic valve (31), in one position connects the storage chamber (33) of the pressure reservoir (29) to a supply line for fuel, and in a second position disconnects this connection.

22. A fuel injection pump as defined by claim 7, in which said magnetic valve (31), in one position connects the storage chamber (33) of the pressure reservoir (29) to a supply line for fuel, and in a second position disconnects this connection.

23. A fuel injection pump as defined by claim 13, in which said magnetic valve (31), in one position connects the storage chamber (33) of the pressure reservoir (29) to a supply line for fuel, and in a second position disconnects this connection.

* * * * *